(12) United States Patent
McMahan et al.

(10) Patent No.: US 11,137,143 B2
(45) Date of Patent: Oct. 5, 2021

(54) SYSTEM HAVING LAYERED STRUCTURE AND METHOD OF MAKING THE SAME

(71) Applicant: General Electric Company, Schenectady, NY (US)

(72) Inventors: Kevin Weston McMahan, Greer, SC (US); Geoffrey David Myers, Greenville, SC (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 15/595,760

(22) Filed: May 15, 2017

(65) Prior Publication Data

US 2017/0248319 A1    Aug. 31, 2017

Related U.S. Application Data

(63) Continuation of application No. 14/189,734, filed on Feb. 25, 2014, now Pat. No. 9,649,690.

(51) Int. Cl.
*B22F 5/04* (2006.01)
*B22F 10/20* (2021.01)
(Continued)

(52) U.S. Cl.
CPC ............. *F23R 3/286* (2013.01); *B22F 5/009* (2013.01); *B22F 5/04* (2013.01); *B22F 7/008* (2013.01);
(Continued)

(58) Field of Classification Search
CPC ............ B22F 3/1055; B22F 2003/1056; B22F 2003/1057; B22F 2003/1058; B22F 2003/1059; B22F 5/009; B22F 5/04; B22F 7/02; B22F 7/04; B22F 7/06; B22F 7/062; B22F 7/064; B22F 7/08; B22F 7/008; B22F 2007/042; B22F 2007/045; B22F 2007/068; B22F 2207/17; B22F 3/008; B22F 3/105; B22F 5/10; B22F 2303/40; B22F 2303/405; B22F 2999/00; B22F 2999/10;
(Continued)

(56) References Cited

U.S. PATENT DOCUMENTS 5,038,014 A *  8/1991  Pratt ..................... B22F 3/1055
                                                        219/121.64
7,326,892 B1    2/2008  Cretegny et al.
(Continued)

FOREIGN PATENT DOCUMENTS

CN         1744941 A      3/2006
CN         1758953 A      4/2006
(Continued)

OTHER PUBLICATIONS

Alloy 48, Alloy Digest, Engineering Alloys Digest, Jun. 1975, 2 pages. (Year: 1975).*
(Continued)

*Primary Examiner* — Vanessa T. Luk
(74) *Attorney, Agent, or Firm* — Fletcher Yoder, P.C.

(57) ABSTRACT

A system includes a layered structure. The layered structure includes first and second coalesced layers and an intermediate layer disposed between the first and second coalesced layers. The first and second coalesced layers have a higher degree of coalescence than the intermediate layer.

16 Claims, 7 Drawing Sheets

(51) Int. Cl.

| | |
|---|---|
| *B33Y 10/00* | (2015.01) |
| *F23R 3/28* | (2006.01) |
| *B23K 15/00* | (2006.01) |
| *F01D 5/14* | (2006.01) |
| *F01D 9/02* | (2006.01) |
| *F01D 9/04* | (2006.01) |
| *F04D 29/02* | (2006.01) |
| *F04D 29/32* | (2006.01) |
| *F23K 5/00* | (2006.01) |
| *F23R 3/00* | (2006.01) |
| *B23K 26/32* | (2014.01) |
| *B23K 26/342* | (2014.01) |
| *B32B 7/02* | (2019.01) |
| *F23M 5/00* | (2006.01) |
| *B22F 5/00* | (2006.01) |
| *B22F 7/06* | (2006.01) |
| *B33Y 80/00* | (2015.01) |
| *B32B 15/01* | (2006.01) |
| *F01D 5/28* | (2006.01) |
| *F01D 25/00* | (2006.01) |
| *B22F 7/02* | (2006.01) |
| *B22F 7/00* | (2006.01) |
| *B23K 26/00* | (2014.01) |
| *B28B 1/00* | (2006.01) |
| *B23K 101/00* | (2006.01) |
| *B23K 103/04* | (2006.01) |
| *B23K 103/08* | (2006.01) |
| *B23K 103/14* | (2006.01) |
| *B23K 103/24* | (2006.01) |
| *B23K 103/18* | (2006.01) |
| *B23K 103/16* | (2006.01) |
| *B29C 64/153* | (2017.01) |

(52) U.S. Cl.
CPC .............. *B22F 7/02* (2013.01); *B22F 7/06* (2013.01); *B22F 10/20* (2021.01); *B23K 15/0086* (2013.01); *B23K 15/0093* (2013.01); *B23K 26/0006* (2013.01); *B23K 26/32* (2013.01); *B23K 26/342* (2015.10); *B28B 1/001* (2013.01); *B32B 7/02* (2013.01); *B32B 15/01* (2013.01); *B33Y 10/00* (2014.12); *B33Y 80/00* (2014.12); *F01D 5/147* (2013.01); *F01D 5/28* (2013.01); *F01D 9/023* (2013.01); *F01D 9/041* (2013.01); *F01D 25/005* (2013.01); *F04D 29/023* (2013.01); *F04D 29/324* (2013.01); *F23K 5/00* (2013.01); *F23M 5/00* (2013.01); *F23R 3/00* (2013.01); *F23R 3/002* (2013.01); *B22F 2207/17* (2013.01); *B22F 2301/15* (2013.01); *B22F 2301/205* (2013.01); *B22F 2301/35* (2013.01); *B22F 2998/10* (2013.01); *B23K 2101/001* (2018.08); *B23K 2103/05* (2018.08); *B23K 2103/08* (2018.08); *B23K 2103/14* (2018.08); *B23K 2103/166* (2018.08); *B23K 2103/24* (2018.08); *B23K 2103/26* (2018.08); *B29C 64/153* (2017.08); *B32B 2264/105* (2013.01); *B32B 2307/102* (2013.01); *B32B 2307/304* (2013.01); *B32B 2603/00* (2013.01); *B32B 2605/18* (2013.01); *F05D 2230/22* (2013.01); *F05D 2230/31* (2013.01); *F05D 2300/10* (2013.01); *F05D 2300/6111* (2013.01); *F23M 2900/05004* (2013.01); *F23R 2900/00018* (2013.01); *Y02P 10/25* (2015.11); *Y10T 428/12028* (2015.01)

(58) Field of Classification Search
CPC . B23K 5/18; B23K 9/04; B23K 9/042; B23K 9/044; B23K 9/046; B23K 9/048; B23K 10/027; B23K 11/0013; B23K 15/0086; B23K 15/0093; B23K 20/1215; B23K 25/005; B23K 26/0006; B23K 26/34; B23K 26/342; B23K 2101/001; B28B 1/001; B32B 7/02; B32B 15/01; B32B 2264/105; B32B 2307/102; B32B 2307/304; B32B 2603/00; B32B 2605/18; F01D 5/147; F01D 5/28; F01D 9/023; F01D 9/041; F01D 25/005; F04D 29/023; F04D 29/324; F05D 2230/22; F05D 2230/31; F05D 2300/10; F05D 2300/6111
See application file for complete search history.

(56) References Cited

U.S. PATENT DOCUMENTS

| | | | |
|---|---|---|---|
| 2007/0283786 A1* | 12/2007 | Kappmeyer | B23B 27/10 76/101.1 |
| 2009/0269497 A1* | 10/2009 | Yousefiani | B22F 3/1055 427/258 |
| 2012/0183701 A1* | 7/2012 | Pilz | B22F 3/1055 427/504 |
| 2013/0195671 A1* | 8/2013 | El-Wardany | F01D 5/286 416/229 R |
| 2013/0224008 A1* | 8/2013 | Cheung | F01D 9/041 415/208.1 |
| 2014/0015172 A1* | 1/2014 | Sidhu | B22F 3/1055 264/497 |
| 2014/0099476 A1* | 4/2014 | Subramanian | B22F 5/009 428/164 |
| 2015/0337664 A1* | 11/2015 | Cosi | F01D 5/141 415/208.1 |

FOREIGN PATENT DOCUMENTS

| | | |
|---|---|---|
| CN | 2846707 Y | 12/2006 |
| CN | 101903566 A | 12/2010 |
| CN | 103221640 A | 7/2013 |
| EP | 2388090 | 11/2011 |
| EP | 2415552 | 2/2012 |
| JP | S6240232 U | 3/1987 |
| JP | 2003307102 A | 10/2003 |
| JP | 2011-526975 A | 10/2011 |
| WO | 2010026397 | 3/2010 |
| WO | 2012016836 | 2/2012 |
| WO | 2012150497 | 11/2012 |
| WO | 2013/103425 A2 | 7/2013 |

OTHER PUBLICATIONS

Wrought and P/M Superalloys, Properties and Selection: Irons, Steels, and High-Performance Alloys, vol. 1, ASM Handbook, ASM International, 1990, p. 963. (Year: 1990).*

Shackelford, James F. and William Alexander, eds., Density of Wrought Stainless Steels, CRC Handbook of Materials Science and Engineering, CRC Press, Third ed., 2001, pp. 60-64. (Year: 2001).*

"Glossary of Metallurgical and Metalworking Terms," Metals Handbook, ASM Handbooks Online, ASM International, 2002, pp. 1, 203, 257. (Year: 2002).*

Machine Translation of Second Office Action and Supplementary Search issued in connection with corresponding CN Application No. 201510087115.3 dated Aug. 14, 2018.

Machine Translation of First Office Action and Search issued in connection with corresponding CN Application No. 201510087115.3 dated Nov. 23, 2017.

Machine Translation of Notification of Reasons for Refusal issued in connection with corresponding JP Application No. 2015-029122 dated Dec. 11, 2018.

(56) References Cited

OTHER PUBLICATIONS

Japanese Office Action for JP Application No. 2015-029122 dated May 7, 2019; 8 pgs.

* cited by examiner

SYSTEM HAVING LAYERED STRUCTURE AND METHOD OF MAKING THE SAME

CROSS-REFERENCE TO RELATED APPLICATIONS

This application is a continuation of U.S. patent application Ser. No. 14/189,734, entitled "SYSTEM HAVING LAYERED STRUCTURE AND METHOD OF MAKING THE SAME," filed Feb. 25, 2014, which is herein incorporated by reference in its entirety for all purposes.

BACKGROUND

The subject matter disclosed herein relates generally to systems incorporating a layered structure and methods for making the layered structure.

A variety of machine components (e.g., turbomachine components) operate under high temperatures (e.g., exhaust temperatures may be on the order of 1000° F.), such as fuel nozzles, compressor blades, turbine blades, compressor wheels, turbine wheels, shroud segments, and combustor-to-turbine transition pieces, among others. These components are generally composed of materials suitable for high levels of thermal stress and thermal expansion experienced during operation. However, even though such components may be made with suitable materials, the life of the component is limited at least in part due to high thermal exposure, thermal expansion, and thermal contraction. For example, the machine components may include various joints and geometries susceptible to thermal stress and wear, particularly due to thermal expansion and contraction.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a layered structure. The layered structure includes first and second coalesced layers and an intermediate layer disposed between the two coalesced layers. The first and second coalesced layers have a higher degree of coalescence than that of the intermediate layer.

In a second embodiment, a method of manufacturing a machine component includes sintering a powder by using varying intensities of an applied energy source to form a layered structure, where the machine component includes the layered structure.

In a third embodiment, a machine component is formed by a process. The process includes applying an energy source to a powder deposited in a chamber so as to sinter the powder. The process also includes sintering the powder in varying degrees throughout a cross-sectional geometry defining a layered structure having at least a first sintered layer, a second sintered layer, and an intermediate layer, where the machine component includes the layered structure.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, a layered structure (e.g., of a machine component) may be manufactured using methods that ultimately improve the performance (e.g., thermal efficiency, exhaust emission, durability, endurance, and/or part life) of the layered structure. The layered structure may be all or part of a machine component, for example a machine component that is subjected to thermal and mechanical stresses over extended periods of time. In some embodiments, such a machine component may be incorporated into a turbomachine, a rotary machine, a hot gas path machine, or some other machine. The machine component may be a component of a turbine of the turbomachine, where the turbine may include a gas turbine, a steam turbine, a hydro turbine, and/or a wind turbine. The layered structure may be all or part of a turbomachine component, for example, a blade (e.g., a rotary blade or stationary vane), a turbine nozzle, a turbine frame, seal, a combustor liner, a combustor cap, a fuel nozzle, a compressor blade, a compressor wheel, a turbine wheel, a shroud segment, a gas pre-mixer, a liquid fuel injector, or a combustor-to-turbine transition piece. In some embodiments, the layered structure and/or the machine component may be a one-piece structure that is integrally formed (e.g., without joints). In other embodiments, the layered structure (e.g., of the machine component) may include multiple pieces that are fabricated separately and joined together. For clarity, the layered structure may be discussed herein as the machine component, and the machine component may be discussed herein as the turbomachine component, where certain embodiments of turbomachine components may be described. However, it should be understood that techniques in accordance with the present disclosure may be applicable to any machine, machine component, and/or layered structure, as described above.

In particular, in embodiments of the present disclosure, a turbomachine system may include a layered turbomachine component manufactured via sintering one or more of its layers into coalesced (e.g., densified) layers. The term "sintering", in accordance with the present disclosure, is included to refer to certain manufacturing techniques used to achieve a coalesced layer, where "coalesced layer" refers to a layer that has been densified from, for example, a powder. In other words, sintering may be a manufacturing process that coalesces a powder into a sintered, or coalesced, layer (e.g., by Direct Metal Laser Sintering (DMLS), Direct Metal Laser Melting (DMLM), Selective Laser Sintering (SLS), Electron Beam Melting (EBM), or any other appropriate additive manufacturing process). The powder may include a metal capable of being sintered by one of the aforementioned processes. By sintering powder to form the component, the component may be manufactured without using expensive and time consuming manufacturing processes such welding and other joining processes. Additionally, one region of the layered structure, machine component, or turbomachine component may have layers sintered in a particular manner that differs from the way the layers of another region of the same turbomachine component are sintered. The layers (and variations thereof) may be configured to tailor the properties of various regions of the component (e.g., thermal, mechanical) to address thermal stress, thermal expansion, and other such forces experienced by each respective region during operation of the system.

Specifically, the sintered layers of the component or structure may be configured to reduce Young's Modulus, modulus of elasticity, and/or thermal expansion coefficients of the component (e.g., to effectively equal zero) in certain regions of the component or structure, and may also affect Poisson's Ratio depending on a desired behavior of the component or structure. For example, a thickness of one or more portions of each sintered layer may be varied such that one portion is allowed to expand to a greater extent than another portion. The sintered layers of the component may also be configured to enable manipulation of thermal gradients and/or thermal conductivity from one region of the component to the other, such that thermal gradients do not exceed a value that may negatively affect the component. In certain embodiments, sintered layers of the component may be configured to reduce oxidation and/or corrosion of portions of the component, e.g., by selecting desirable materials for use in areas of the component that may benefit from reduced oxidation and/or corrosion.

Further, in certain embodiments, one or more of the sintered layers may be less dense than the other sintered layers, or even evacuated (e.g., a vacuum), such that the less dense or evacuated (e.g., vacuum) layer serves as a thermal barrier and/or mechanical stress distributor (described below). By way of non-limiting example, turbomachine components such as fuel nozzles, which operate in high temperature areas of the turbomachine, may benefit from the above described thermal barrier. For example, fuel nozzles of turbomachines may include stems that are exposed to oxidant (e.g., air) at a compressor discharge temperature, which may include temperatures of up to 1000° F. (540° C.) or more. Tips of fuel nozzles may be exposed to flame radiation and convection from a combustor, which may include temperatures of up to 3500° F. (1930° C.) or more. By including the thermal barrier described above via a less dense or evacuated layer, fuel-wetted surfaces and, thus, fuel routed through the fuel nozzle in contact with the fuel-wetted surfaces may be blocked from exposure to the high temperatures described above, which may otherwise affect flow, breakdown, consistency, and/or effectiveness of the fuel.

Further, sintered layers with undensified powder (e.g., less densified than surrounding layers), in accordance with the present disclosure, may at least partially reduce mechanical stresses imparted to other regions (e.g., layers) of the structure by enabling distribution of force/energy. As one example, the less dense layer may reduce resonant response of turbomachine components. In other words, sintered layers with undensified powder may serve as acoustic barriers within the layered structure, such that resonant energy is distributed across non-sintered powder, rather than across the entire structure. For example, some turbomachine components experience dynamic pressure oscillations and other aero mechanical noise due to vibration. Consequently, presently contemplated embodiments of undensified or less densified powder layers may be strategically located in such turbomachine components to 'deaden' or reduce resonant response areas of such components turbomachine components that experience high dynamic pressure oscillations and other aero mechanical noise.

Figure 1:
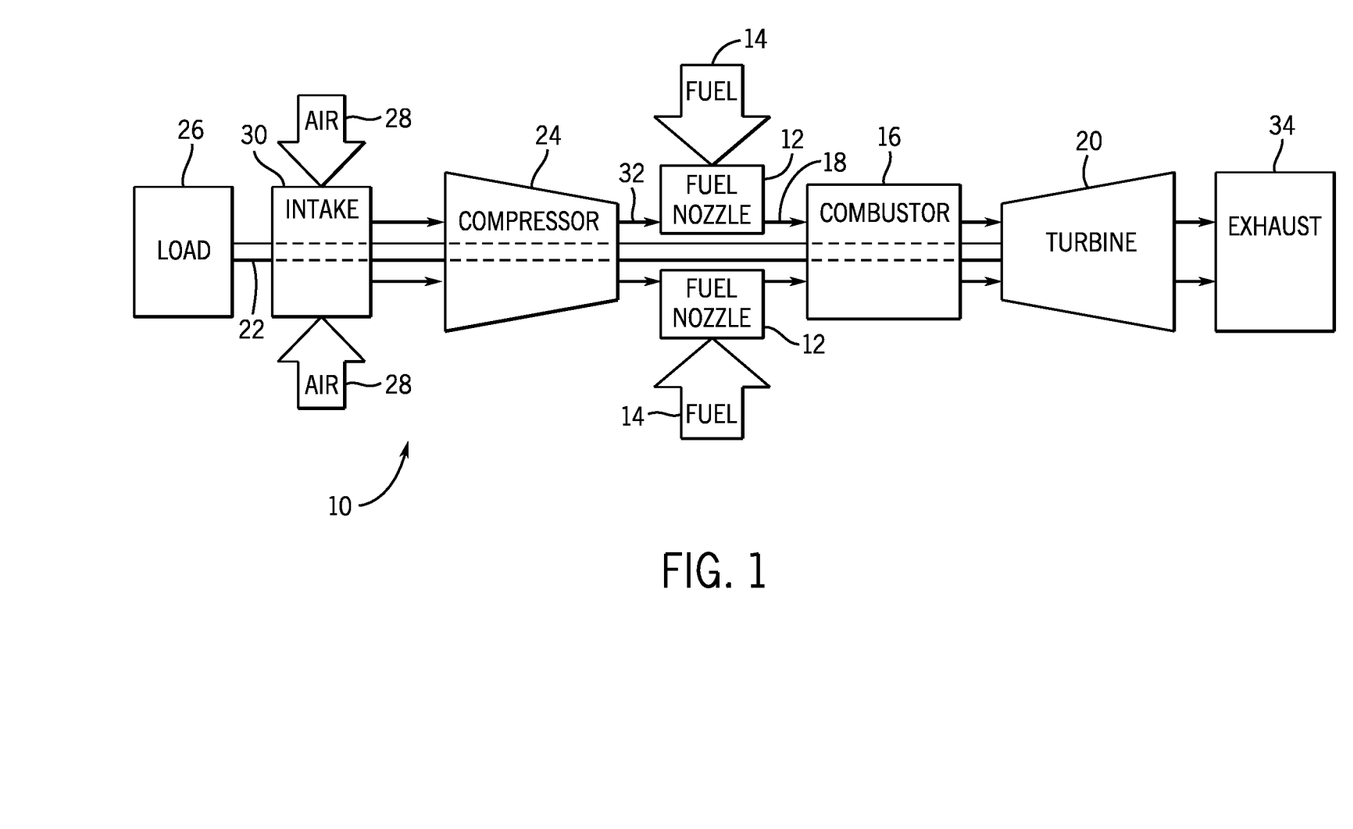
FIG. 1 is a block diagram of an embodiment of a turbomachine system.

Turning now to the drawings and referring first to FIG. 1, a block diagram of an embodiment of a turbine system 10 is illustrated. It should be noted that the present disclosure may relate to any turbomachine system, and that the turbine system 10 discussed herein does not limit the scope by which the present disclosure applies. A turbomachine system may relate to any system that involves the transfer of energy between a rotor and a fluid, or vice versa, and the turbine system 10 is only meant to serve as a representation of an embodiment of a turbomachine system. Furthermore, certain techniques described herein may also be applicable to any component that experiences thermo-mechanical stress (e.g., any machine that utilizes a combustion process, a heat engine, etc.). The illustrated turbine system 10 includes, among other features, a fuel nozzle 12, a fuel supply 14, and a combustor 16. As depicted, the fuel supply 14 routes a liquid fuel and/or gas fuel, such as natural gas, to the turbine system 10 through the fuel nozzle 12 into the combustor 16. After mixing with pressurized oxidant (e.g., air), shown by arrow 18, ignition occurs in the combustor 16 and the resultant exhaust gas causes blades within a turbine 20 to rotate. The coupling between blades in the turbine 20 and a shaft 22 will cause rotation of the shaft 22, which is also coupled to several components throughout the turbine system 10, as illustrated. For example, the illustrated shaft 22 is drivingly coupled to a compressor 24 and a load 26. As appreciated, the load 26 may be any suitable device that may generate power via the rotational output of the turbine system 10, such as a power generation plant or a vehicle.

Air supply 28 may route air via conduits to an air intake 30, which then routes the air into the compressor 24. The compressor 24 includes a plurality of blades drivingly coupled to the shaft 22. When the shaft 22 rotates as a result of the expansion of the exhaust gases within the turbine 20, the shaft 22 also causes the compressor blades to rotate, which compresses the air from the air intake 30 to generate compressed air, depicted as arrows 32. The compressed air is routed to the fuel nozzles 12 and the combustor 16. The fuel nozzle 12 may then mix the pressurized air and fuel to produce an air/fuel mixture. After passing through the turbine 20, the exhaust gases exit the system at an exhaust outlet 34.

During the combustion phase of the illustrated gas turbine's 10 operation, temperatures may be on the order of 1000° F. (approximately 540° C.) or more, as described above. Indeed, many of the components involved in the turbine system 10 of FIG. 1 and other similar turbomachine systems, and especially those working in conjunction with the combustor 16, operate under high thermal loads. For example, any components in thermal communication with the combustor 16 or products of combustion from the combustor 16, and/or in thermal communication with a discharged pressurized air from the compressor 24, may be considered to be along a hot gas path of the turbine system 10. In accordance with present embodiments, any one or a combination of components placed along this hot gas path may be produced using the techniques described herein. By way of non-limiting example, these components may include blades and/or wheels of the compressor 24, blades and/or wheels of the turbine 20, the fuel nozzle(s) 12, a liner of the combustor 16, a transition piece of the combustor 16, a diffusion plate of the combustor 16, shroud segments of the turbine 20, and so on.

Figure 2:
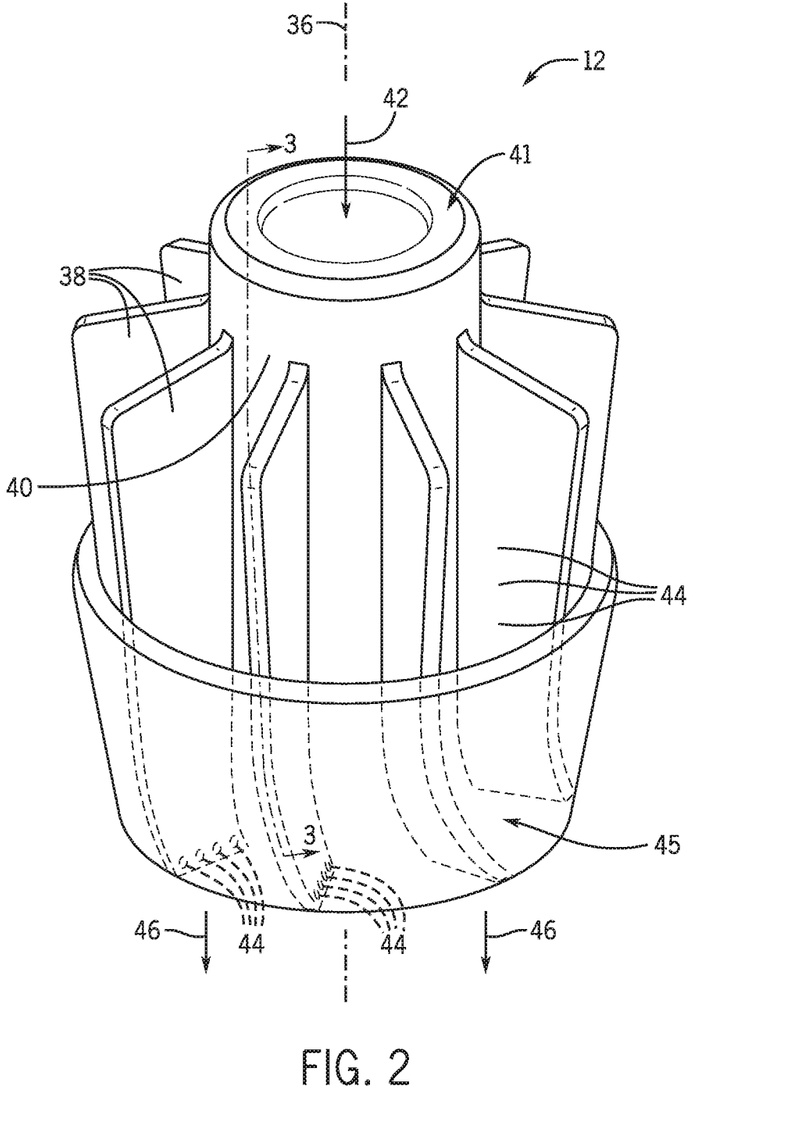
FIG. 2 is a schematic perspective view of an embodiment of a turbomachine component used in the turbomachine system of FIG. 1.
Figure 3:
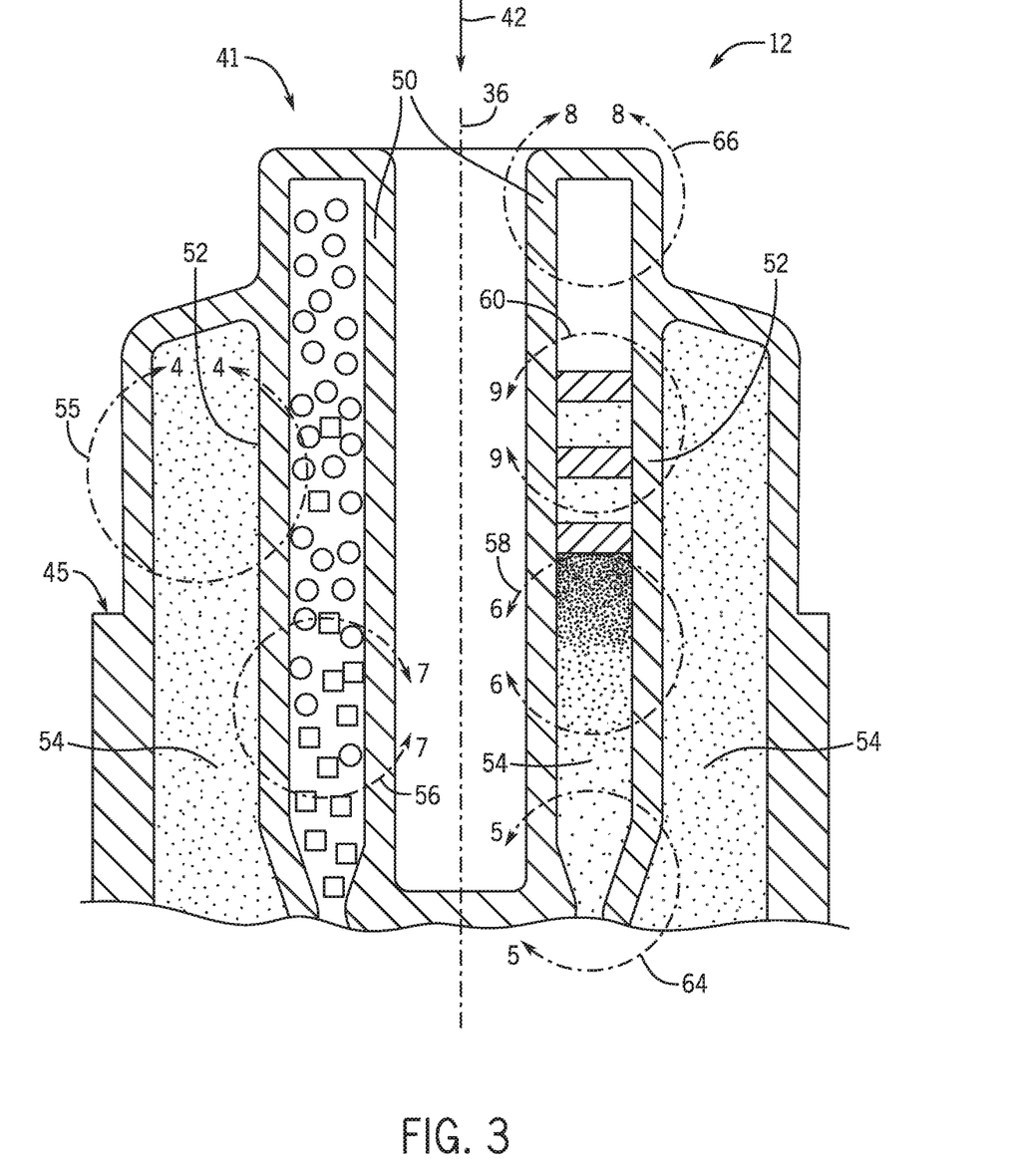
FIG. 3 is a schematic cross-sectional view of an embodiment a portion of the turbomachine component of FIG. 2.

Further illustrated in FIGS. 2 and 3 is an embodiment of the fuel nozzle 12 manufactured in accordance with the present disclosure. The fuel nozzle 12, in accordance with present disclosure, is constructed using any of the additive manufacturing techniques discussed above. Again, the illustrated embodiments of the fuel nozzle 12 in FIGS. 2 and 3 are merely representative embodiments of a turbomachine component that may benefit from the present disclosure. Many turbomachine components, whether they operate under high thermal stress or otherwise, may benefit from the embodiments discussed herein.

The embodiment of the fuel nozzle 12 illustrated in FIGS. 2 and 3 may be responsible for mixing compressed oxidant (e.g., air) with fuel and delivering the mixture to the combustor 16. The fuel nozzle 12 may be centered about an axis 36, and blades 38 disposed on an outer surface 40 of an inner tube 41 of the fuel nozzle 12 may facilitate mixing of the compressed air with the fuel by causing the fuel and the air to swirl about the axis 36. The fuel may move downwardly in direction 42 into an internal fuel chamber in the center of the fuel nozzle 12 (e.g., within the inner tube 41), where the fuel exits the fuel chamber into the blades 38 and out through the blades 38 via holes 44. Thus, the compressed oxidant may travel in direction 42, outside of the inner tube 41 and inside an outer tube 45 that partially extends (or, in other embodiments, full extends) along the blades 38, such that the oxidant mixes with fuel being expelled from inside the inner tube 41 through the holes 44 of the blades 38 and into the path of the oxidant. Thus, in operation, the fuel is injected into the air flow about the blades 38 (e.g., between the inner tube 41 and the outer tube 45), and the air/fuel mixture exits the fuel nozzle as indicated by arrows 46. In some embodiments, the entire fuel nozzle 12 may be enclosed by a separate housing that directs the flow of the air/fuel mixture along a path running generally parallel to the axis 36 (e.g., as indicated by arrows 46) toward the combustor 16 (not shown). Because the fuel nozzle 12 is positioned near the combustor 16 in the gas turbine system 10, the fuel nozzle 12 may operate under high temperatures and may be subject to high thermal stress as a result.

In accordance with an embodiment, all or portions of the fuel nozzle 12 may be manufactured in such a way so as to handle these high thermal stresses, while also achieving a lower weight and/or desirable geometry. For example, the blades 38, the inner tube 41, and/or the outer tube 45 may be produced using any one or a combination of the additive manufacturing techniques noted above and discussed in detail below. The entire fuel nozzle 12 or any other hot gas path turbomachine component may be integrally formed via techniques in accordance with the present disclosure, or individual parts of the fuel nozzle 12 (e.g., the blades 38, the inner tube 41, and the outer tube 45) or of any other hot gas path turbomachine component may be formed individually and joined together. By integrally forming an entire turbomachine component (e.g., the fuel nozzle 12), the manufacturing process may be streamlined. Additionally, by using additive manufacturing processes and techniques referenced above that will be discussed in detail below (e.g., with reference to FIGS. 3 and 10) to form the turbomachine component (e.g., the fuel nozzle 12) or parts of the turbomachine component, in an embodiment, the turbomachine component or parts of the turbomachine component may have a varying material construction—such as a varying degree of density, varying amounts of certain materials, and so forth, which is generally not achieved using other manufacturing techniques such as casting. This varied material construction may be used to achieve different thermal and/or mechanical properties in different portions of the fuel nozzle 12.

Turning now to FIG. 3, an embodiment of a portion of the fuel nozzle 12 is shown in a cross-sectional front view taken along line 3-3 of FIG. 2. In the illustrated embodiment, various layers form the fuel nozzle 12, the layers having been sintered or coalesced (e.g., densified) during manufacturing. The illustrated embodiment includes a first layer 50 (e.g., first coalesced layer), a second layer 52 (e.g., second coalesced layer), and an intermediate layer 54 (e.g., intermediate coalesced layer). It should be noted that because of certain types of geometries associated with turbomachine components, one region of a component may have a first layer 50 that transitions into the second layer 52 in another region of the component, and vice versa. Accordingly, the terms first layer 50 and second layer 52 used to discuss an entire turbomachine component (e.g., the fuel nozzle 12 in FIG. 3) are included to clarify that the fuel nozzle 12 includes multiple layers, and to differentiate the intermediate layer 54 disposed between the two layers. However, when discussing local cross-sections of a particular region of a turbomachine component (e.g., with respect to later figures of the present disclosure), the first layer 50 and second layer 52 may be different and include different geometries and/or characteristics within the respective region.

In order to achieve the desired layers (e.g., the first layer 50, the second layer 52, and the intermediate layer 54), additive manufacturing techniques may be used in accordance with the present disclosure. For example, in the illustrated embodiment, the fuel nozzle 12 may be fabricated from bottom to top (e.g., opposite direction 42). In other words, a first cross-sectional slice perpendicular to the longitudinal axis 36, having the first layer 50, the second layer 52, and the intermediate layer 54, may be generated by selectively applying a heat source to a bed of powder. The heat source may be selectively applied manually or via a computing device having tangible, machine-readable, non-transitory media storing one or more sets of instructions that, when executed by a processor, selectively applies the heat source. Once the first cross-sectional slice is generated via the technique above, a second cross-sectional slice may be generated via the same technique applied to a bed of powder deposited on top of the first cross-sectional slice. The technique may be repeated until the fuel nozzle 12, or any other turbomachine component, is fabricated. By selectively applying the heat source (e.g., by selectively applying a varying intensity of the heat source or selectively applying a constant intensity of the heat source for a varying amount of time), each layer (e.g., the first layer 50, the second layer 52, and the intermediate layer 54) of the cross-sectional slice may be sintered/coalesced to a different degree with respect to the other layers (e.g., the first layer 50, the second layer 52, and the intermediate layer 54) of the cross-sectional slice. For example, the intermediate layer 54 may be sintered to a lesser degree than that of the first layer 50 and the second layer 52. Embodiments of sintering techniques of the present disclosure will be discussed in greater detail with reference to FIG. 10.

Continuing with the illustrated embodiment of FIG. 3, the first layer 50 and the second layer 52 generally bound the intermediate layer 54. In this embodiment, the intermediate layer 54 is sintered to a lesser degree compared to the first and second layers 50, 52. In one embodiment, the first and second layers 50, 52 may be fully sintered (e.g., sintered to the highest degree possible by the manufacturing process and/or manufacturing equipment), or may be only partially sintered, but sintered to a different degree compared to one another and/or compared to the intermediate layer 54. By way of non-limiting example, the intermediate layer 54 may include partially coalesced cobalt-chromium, stainless steel, inconel, titanium, or a nickel based alloy. Each layer may be constructed using various sintering techniques in various regions of the turbomachine component. For example, a first region 55 of the fuel nozzle 12 may include the first layer 50, the second layer 52, and the intermediate layer 54, where the first and second layers 50, 52 are fully sintered (e.g., fully sintered relative to the capability of the additive manufacturing technique used to generate the layers) and the intermediate layer 54 is sintered to a lesser degree than that of the first and second layers 50, 52. A second region 56 of the illustrated fuel nozzle 12, or turbomachine component, may include functionally graded sintering of a layer (e.g., the layer is a single sintered material in one portion of the region and gradually becomes another sintered material until the layer is a different single sintered material in a second portion of the region). Further, a third region 58 of the illustrated fuel nozzle 12, or other turbomachine component, may include a sintered layer with a gradually decreasing degree of sintering from one portion of the third region to another portion of the third region (e.g., the materials used to form the layer do not change). Further, a fourth region 60 of the illustrated fuel nozzle 12, or turbomachine component, may include extensions 62 (e.g., rods, or another extending feature) extending between the first layer 50 and the second layer 52 and through the intermediate layer 54.

Further, a fifth region 64 may include one or more sintered layers (e.g., the first layer 50, the second layer 52, and/or the intermediate layer 54) with varying cross-sectional thickness. Further, a sixth region 66 may include an evacuated region (e.g., a region that is free of powder and has air or another gas filling the region, a region filled with powder but in a vacuum, or a region that is free of powder and in a vacuum). The term "vacuum" may refer to a condition of a region with a gas pressure lower than atmospheric pressure or lower than some other reference point.

It should be noted that the various configurations discussed above may be used in any combination in, and in any region of, any turbomachine component. The embodiment of the fuel nozzle 12 and the respective locations and arrangements of each region as discussed above are each meant to be a representative example.

Figure 4:
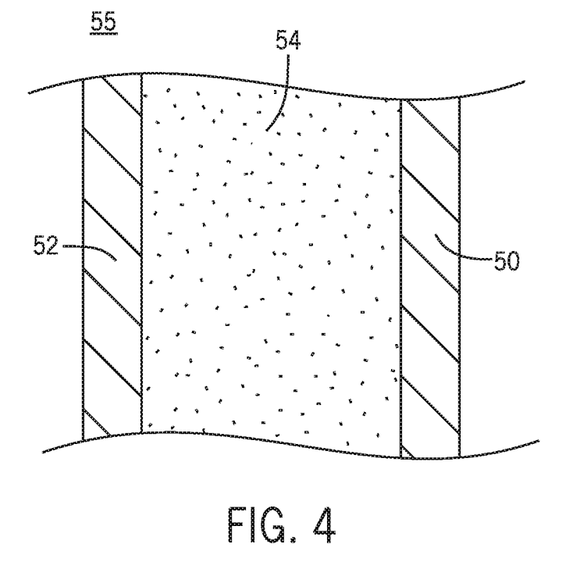
FIG. 4 is a schematic cross-sectional view of an embodiment of a layered region of the turbomachine component of FIG. 3.

One embodiment of the first layer 50, the second layer 52, and the intermediate layer 54 is illustrated in FIG. 4, which is a view taken within line 4-4. In the illustrated embodiment, the first and second layers 50, 52 may be fully sintered, and the intermediate layer 54 may be sintered to a degree less than that of the first and second layers 50, 52, or partially sintered (e.g., sintered to a degree less than the highest possible degree of sintering given the manufacturing process and/or manufacturing equipment). In other words, the first and second layers 50, 52 may be considered 100% sintered relative to the capabilities of the manufacturing equipment, and the intermediate layer 54 may be considered less than 100% sintered relative to the capabilities of the manufacturing equipment. Thus, the coalesced powder in the first and second layers 50, 52 is more compact (e.g., more dense), while the coalesced powder in the intermediate layer 54 is less compact (e.g., less dense), such that the coalesced powder in the intermediate layer 54 may include space between powder particles, which may allow the powder particles to expand without displacing the position of the particles and surrounding structure(s). Accordingly, the intermediate layer 54 in the illustrated embodiment is depicted as dots to indicate that more space may be between each powder particle in the intermediate layer 54 as compared to space between powder particles in the first and second layers 50, 52.

The partial sintering of the intermediate layer 54 may allow for the intermediate layer 54 (e.g., the sintered portions and/or the non-sintered powder) to expand when heated. Accordingly, the intermediate layer 54 may reduce or negate the effect of thermal expansion coefficients. That is, the intermediate layer 54 may enable a greater degree of thermal expansion, which mitigates the effects of expansion on the structural integrity of the turbomachine component. Further, the intermediate layer 54 may serve as a thermal barrier and/or may serve as a damper of a resonant response to dynamic pressure oscillations or other aero mechanical noise sources associated with the turbomachine component, as previously described. Further, the first and second layers 50, 52 may be fully sintered (e.g., fully sintered as described above) to increase rigidity, which may provide stability when the component is placed under other external loads (e.g., aerodynamic forces and/or other forces experienced during operation). In some embodiments, the ratio of percent of sintering of the first and second layers 50, 52 relative to the intermediate layer 54 may be in the range of 5:1 to 5:4, 4:1 to 4:3, or 3:1 to 3:2, or any sub range thereof.

It should also be noted that the intermediate layer 54 may have a different coefficient of thermal expansion compared to the first and second layers 50, 52. In this way, the degree of expansion due to a given thermal stimulus may be controlled by controlling the extent and geometry of the intermediate layer 54. Further, the intermediate layer 54 may enable the first and second layers 50, 52 to thermally expand more evenly than if the intermediate layer 54 had a similar or the same degree of sintering compared to the first and second layers 50, 52.

Figure 5:
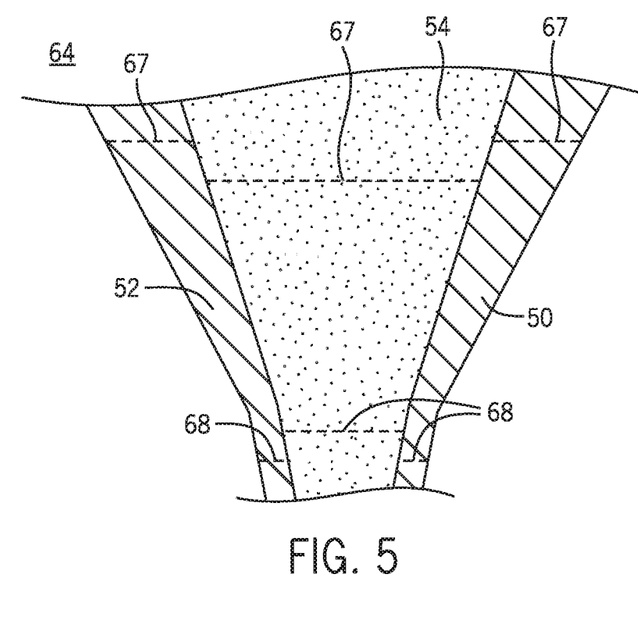
FIG. 5 is a schematic cross-sectional view of an embodiment of a layered region of the turbomachine component of FIG. 3.

Another embodiment of the first layer 50, the second layer 52, and the intermediate layer 54 is illustrated in the view of FIG. 5, which is a view of the fourth region 64 taken within line 5-5 of FIG. 3. In the illustrated embodiment, the intermediate layer 54 may be sintered to a lesser degree than that of the first and second layers 50, 52, and the first and second layers 50, 52 may be fully sintered or sintered to a degree higher than that of the intermediate layer 54. In this embodiment, one or more of these layers may have a varying cross-sectional thickness within the fourth region 64 (or any other portion of the nozzle 12). For example, in one portion of the fourth region 64, a first cross-sectional thickness 67 of each layer is greater than a second cross-sectional thickness 68 of each layer in a second portion of the fourth region 64. In certain embodiments, only the first layer 50, only the second layer 52, only the intermediate layer 54, or any combination of these layers, may include varying cross-sectional thickness. It should also be noted that the varying cross-sectional thickness can be gradual or tapered as illustrated in the embodiment of FIG. 5, or may be step-wise. Indeed, the cross-sectional thickness may vary in any manner, and may generally be increased or decreased based on the intended geometry of the component or thermal considerations of the particular region of the component. For example, a larger cross-sectional thickness of the intermediate layer 54 may be included to change (e.g., reduce) thermal expansion in a particular portion of the fourth region 64. Likewise, a larger cross-sectional thickness of the first layer 50 or the second layer 52 may be included in certain areas to accommodate areas that experience greater loads (e.g., aerodynamic forces) by increasing rigidity.

Figure 6:
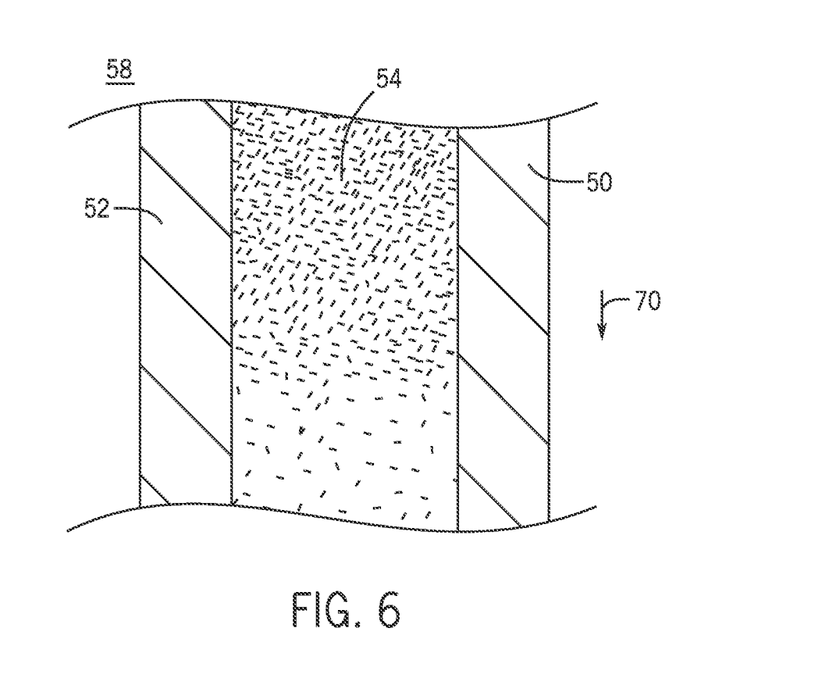
FIG. 6 is a schematic cross-sectional view of an embodiment of a layered region of the turbomachine component of FIG. 3.

The second region 58, taken within line 6-6 of FIG. 3, is illustrated in FIG. 6. In the embodiment illustrated in FIG. 6, the second region 58 includes an embodiment of the intermediate layer 54 in which a gradually decreasing layer of sintering in the direction indicated by arrow 70 is present. It should be noted that the direction indicated by the arrow 70 is merely representative. The degree of sintering may gradually decrease, for example, in a direction crosswise (e.g., perpendicular) to the arrow 70. Further, the degree of sintering may be greater from the intermediate layer 54 toward the first layer 50, or from the intermediate layer 54 toward the second layer 52, or may be greater from the center (or other point, line, block, or region) of the intermediate layer 54 and out in one or more directions (e.g., toward the first and/or second layers 50, 52, or in any other direction). Further, the variation in the degree of sintering may not be gradual (e.g., it may be stepwise). In other words, the variation in the degree of sintering of a given layer may be directional or may not be directional, may increase or decrease, and may be gradual or may not be gradual. Generally, a first portion of the second region 58 with a higher degree of sintering may enable a more rigid structure for handling greater external loads applied to that portion (e.g., may increase rigidity of that portion), while a second portion of the second region 58 with a lower degree of sintering may enable greater flexibility with respect to thermal expansion, thereby mitigating the effect of thermal expansion on the structural integrity of the second region 58 (or all or portions of the nozzle 12). In other embodiments, the varying degrees of sintering may occur in the first layer 50, the second layer 52, the intermediate layer 54 as discussed above, or any combination thereof.

Figure 7:
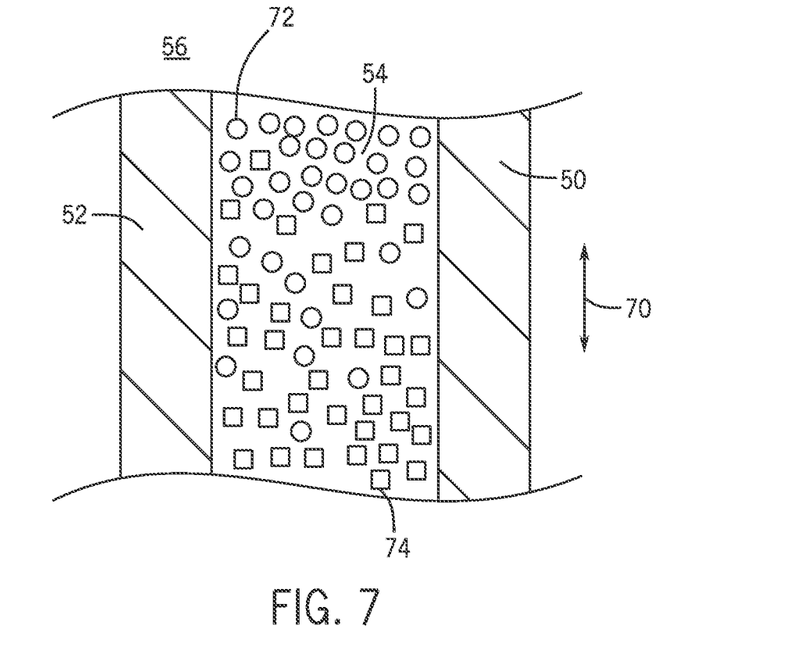
FIG. 7 is a schematic cross-sectional view of an embodiment of a layered region of the turbomachine component of FIG. 3.

A cross-sectional view of an embodiment of the first region 56, taken within line 7-7 of FIG. 3, is illustrated in FIG. 7. In the illustrated embodiment, the intermediate layer 54 is functionally graded (e.g., gradually changed from one material to another material, as previously described). For example, one portion of the intermediate layer 54 in the first region 56 is sintered with a first material 72, for example cobalt chromium. The first material 72 is then gradually replaced (e.g., the material gradually changes) with a second material 74 in a second portion of the first region 56, for example a nickel based alloy. Thus, the first region 56 may include portions that include only the first material 72, portions that include a combination of the first and second materials 72, 74 (e.g., a transition region), and portions that include only the second material 74. The intermediate layer 54 may be functionally graded in this way such that one portion or region of the turbomachine component benefits from the properties of the first material 72 while a second portion or region of the turbomachine component benefits from the properties of the second material 74, while an intermediate or transition region benefits from having both, while also mitigating additional stresses caused by different materials interfacing with one another (e.g., in situations where the first and second materials 72, 74 have different properties). For example, materials may be selected in a particular region of the component such that oxidation and/or corrosion in the particular region is reduced or eliminated.

As another non-limiting example, the first material 72 may increase the rigidity of the intermediate layer 54 while the second material 74 enables greater flexibility of the intermediate layer 54. It should be noted that "functionally graded" may include two or more materials, and that a direction of the functional grade may be in any one or a combination of directions, and is not limited to the direction indicated by arrow 70. For example, in other embodiments, the direction may be crosswise (e.g., substantially perpendicular) to the direction indicated by arrow 70, or any other one or more directions, and may include two or more materials (e.g., there may be mixtures of two or more materials, and/or the functional grading may be from the first material 72, to the second material 74, to a third material, and so on. In still other embodiments, the functionally graded sintering may occur in the first layer 50, the second layer 52, either in lieu of or in addition to the intermediate layer 54, or any combination of the first, second, or intermediate layers 50, 52, 54.

Figure 8:
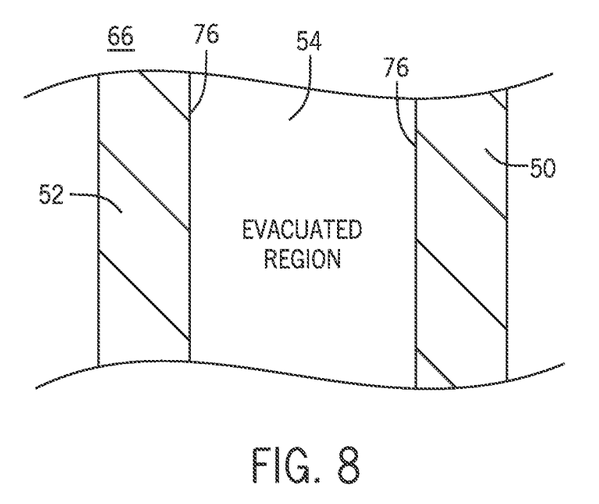
FIG. 8 is a schematic cross-sectional view of an embodiment of a layered region of the turbomachine component of FIG. 3.

An embodiment of the fifth region 66 is illustrated in FIG. 8, which is a cross-sectional view taken within line 8-8 of FIG. 3. In the illustrated embodiment, intermediate layer 54 corresponds to or otherwise includes an evacuated region (e.g., the intermediate layer 54 is sealed and substantially void of matter). The evacuated region may serve as a thermal barrier or a thermal insulating layer between the first layer 50 and the second layer 52 of the fifth region 66. In other words, in one embodiment, the evacuated region corresponding to all or a portion of the intermediate layer 54 may not conduct thermal energy from the first layer 50 to the second layer 52, or, more generally, may reduce thermal conduction between the first and second layers 50, 52. Additionally, the evacuated region (e.g., the intermediate layer 54 in the illustrated embodiment) may cause a reduction in the temperature of wetted inner surfaces 76 of the first layer 50 and the second layer 52, and of other portions of the component in general, compared to conventional configurations utilizing traditional manufacturing techniques. This may block, for example, thermal exposure of liquid fuel within a liquid fuel injector. Accordingly, thermal barriers in accordance with present embodiments may block fuel-wetted surfaces and, thus, fuel being routed through the fuel injector in contact with the fuel-wetted surfaces, from being fully exposed to high temperatures and associated thermal stresses.

Figure 9:
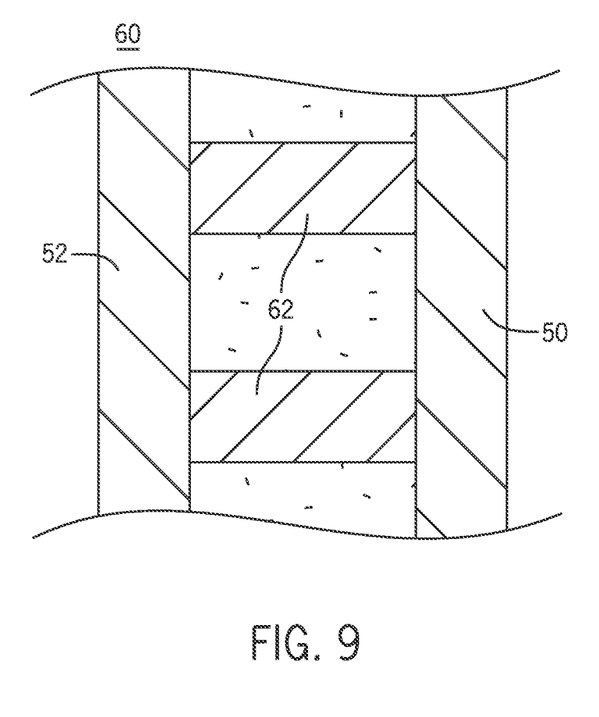
FIG. 9 is a schematic cross-sectional view of an embodiment of a layered region of the turbomachine component of FIG. 3.

An embodiment of the third region 60 of the turbomachine component is illustrated in FIG. 9, which is a cross-sectional view taken within line 9-9 of FIG. 3. In the illustrated embodiment and as noted above with respect to FIG. 3, extensions 62 may be disposed between (e.g., connect) the first and second layers 50, 52, and may completely or partially extend through the intermediate layer 54. In certain embodiments, the extensions 62 may be integrally formed with the first and second layers 50, 52. In other embodiments, the extensions 62 may be fabricated separately and joined between the first and second layers 50, 52. In either case, the extensions 62 may be sintered from any of the previously mentioned materials (e.g., the extensions 62 may be the same material as the layers 50, 52, and 54, or the extensions 62 may be a different material), and the intermediate layer 54 disposed around the extensions 62 may be sintered to a lesser degree compared to the first layer 50, the second layer 52, and/or the extensions 62. The extensions 62 may serve to increase rigidity of the portion of the turbomachine component containing the extensions 62, while the intermediate layer 54 mitigates stresses resulting from thermal expansion. Thus, the extensions 62 may serve to reinforce the strength of the overall component, while enabling different thermal coefficients of expansion across the cross-section of the component. The extensions 62 may also be configured to facilitate thermal communication between the first layer 50 and the second layer 52. For example, the area of the turbomachine component including the extensions 62 may experience higher temperatures on one side of the layered structure (e.g., near the first layer 50) than the other side of the layered structure (e.g., near the second layer 52). The thermal energy may be distributed to the second layer 52 from the first layer 50 via the extensions 62, e.g., in a way such that the second layer 52 serves as a heat sink for the first layer 50. In certain embodiments, sharing the thermal load in this way may reduce the occurrence of localized hot regions of the first layer 50 and/or the second layer 52. This may reduce the likelihood that a particular area of the turbomachine component will fail due to variations in thermal expansion/thermal stress.

As noted above, the layered structures of the present disclosure enable increased flexibility in component geometry selection relative to other, non-layered components not constructed using the disclosed embodiments. For example, without the disclosed techniques, a slotted connection between first and second turbomachine components may include a space to account for thermal expansion of the components during operation. This may result in a poor seal between the two components. With the sintered layered structures discussed herein, thermal expansion is not limited to an outward expansion—but may also occur inwardly toward the intermediate layer 54, which may include empty space and/or particles that are not fixed in place. Thus, a similar configuration with a slotted connection between a first turbomachine component with sintered layers and a second turbomachine component with sintered layers in accordance with present embodiments may enable a connection with a tighter fit (e.g., without a space to account for thermal expansion), improving the seal and, in certain embodiments, operational efficiency of the turbomachine system as a whole.

Each of the above discussed embodiments of the turbomachine component having various sintered layers may be produced by a method that includes one or more additive manufacturing techniques. On embodiment of such a method 88 is illustrated as a flow diagram in FIG. 10. The method 88 may be performed by an additive manufacturing system having specialized equipment and one or more processor-based controllers for performing the acts described herein. For example, an additive manufacturing system that performs the method 88 may have one or more computing devices having tangible, machine-readable, non-transitory media storing one or more sets of instructions that, when executed by a processor, cause various components of the system to perform the acts of method 88. Certain inputs may be provided to the system to facilitate the manufacturing of one or more components using such a system, such as computer-aided design (CAD) drawings/files, 3D solid models, material composition inputs, and the like.

Figure 10:
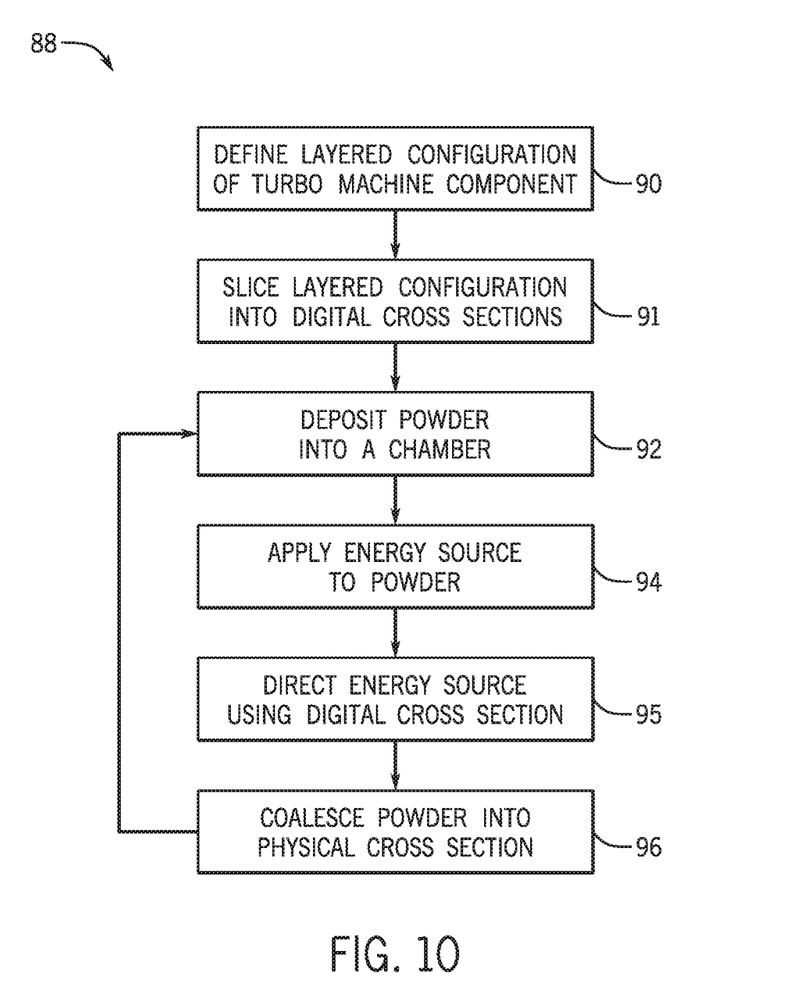
FIG. 10 is a process flow diagram illustrating an embodiment of a method of manufacture of the turbomachine component of FIG. 3.

In the method 88, a layered or cross-sectionally sliced configuration of the turbomachine component may be defined (block 90), e.g., by a solid model. For example, the solid model may define a geometry of a fuel nozzle, a transition piece, a turbine blade or compressor, a shroud, a wheel, a seal, and so on. The acts represented by block 90 may include, by way of non-limiting example, acts performed by the manufacturing system such as accessing the solid model from a non-transitory storage medium, and loading the file into an appropriate computer-based application (e.g., manufacturing software stored on the system).

Because certain additive manufacturing techniques may generate the particular device/component layer-by-layer, the method 88 may also include portioning (block 91) the solid model into digital slices or cross-sections. For example, the computer-based application described above may slice the solid model into digital slices or cross-sections. In some embodiments, an input may also be provided as to the degree of sintering/coalescing of various layers of the work piece, or various portions of one or more layers, for example to generate a layered structure having varying degrees of certain properties (e.g., hardness, thermal conductivity, and so on).

A powder may be deposited (block 92) into a chamber, for example using a vacuum, a cylindrical roller, and/or some other equipment that is capable of transferring and depositing a powder (e.g., a ceramic and/or metallic powder) into a chamber that is at least partially evacuated (e.g., a chamber at reduced pressure compared to ambient). For example, the cylindrical roller may be used to push the powder from a powder storage container into a build chamber. The powder storage container may push powder upwardly, and the cylindrical roller may roll across the top of the powder storage container toward the build chamber such that powder is pushed from the top of the powder storage container into the build chamber. In some embodiments of the method 88, portions of the powder corresponding to a position of the intermediate layer 54 may be evacuated, for example to produce the evacuated region of FIG. 8.

After or as the powder is appropriately positioned, an energy source is applied (block 94) to the powder (e.g., via a laser). The energy source may be directed using the digital cross-sections obtained from block 91 as a blue print (e.g., via computer numerical control (CNC)), as shown in blocks 94 and 95, respectively. The geometry of the particular layer being sintered/coalesced may be defined by the areas in which the manufacturing system applies energy, while certain of the properties of the part may be determined by the amount of energy deposited into particular areas of the powder. For example, in a general sense, a greater flux provided by a laser beam/electron beam, (e.g., more energy) may result in more sintering/coalescing of the powder, resulting in greater hardness, while less energy deposited by the system may result in a more structurally flexible portion of the component. For example, the extensions 62 discussed above, if integrally formed with the layers of the turbomachine component, may be formed by providing a greater amount of energy to the powder along cross-sectional rectangles of the intermediate layer 54, which may ultimately result in a three-dimensional rod-like structure. Indeed, similar approaches may be employed to generate, for example, the embodiments depicted in FIGS. 4-6 and 9.

In still other embodiments, the acts represented by blocks 92-95 may include providing additional types of powders (e.g., different metals/alloys/ceramics) into the chamber, and incorporating those powders into certain portions/regions of the component being manufactured. Indeed, such techniques may be used to produce, for example, the embodiment depicted in FIG. 7. Thus, upon provision of a suitable amount of energy, the powder is coalesced (block 96) into a physical cross-section having the geometry of the digital cross-section defined in accordance with block 90. All or a portion of the method 88 (e.g., the process from block 92 through block 96) may be repeated to produce successive layers or slices from the digital cross-sections, each layer or slice having one or more of the first layer 50, second layer 52, or intermediate layer 54, and each cross-section is physically built on top of the preceding cross-section until the turbomachine component is built as a physical replica of the solid model. Once each cross-section has been built and the structure is complete, unwanted powder left behind from the process described above may be removed from the assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of manufacturing a layered structure having layers coalesced from one or more powder materials, comprising:
   heating a first powder to coalesce a first layer of the layered structure, wherein the first layer comprises a first material density;
   heating a second powder to coalesce a second layer of the layered structure, wherein the second layer comprises a second material density;
   disposing an intermediate layer between the first layer and the second layer; and
   sealing the intermediate layer such that the intermediate layer comprises an evacuated region having a pressure lower than atmospheric pressure.

2. The method of claim 1, wherein the first powder, the second powder, or a combination thereof comprises at least one of cobalt-chromium, stainless steel, titanium, a chromium-nickel based alloy, or a nickel based alloy.

3. The method of claim 1, wherein heating the first powder comprises selectively applying a first amount of energy to the first powder, wherein heating the second powder comprises selectively applying a second amount of energy to the second powder, and wherein the first amount of energy is greater than the second amount of energy.

4. The method of claim 1, wherein the first powder comprises a first material and the second powder comprises a second material different than the first material.

5. The method of claim 1, comprising sealing the intermediate layer via at least the first layer and the second layer.

6. The method of claim 5, comprising sealing the intermediate layer via the first layer, the second layer, and at least one extension extending from the first layer to the second layer.

7. A method of manufacturing a layered structure for a turbomachine component, comprising:
   selectively heating a first powder to form a first coalesced layer having a first degree of material density;
   selectively heating a second powder to form a second coalesced layer having a second degree of material density; and
   disposing an intermediate layer between the first and second coalesced layers and sealing the intermediate layer such that the intermediate layer comprises an evacuated region having a pressure lower than atmospheric pressure and configured to serve as a thermal barrier, an acoustic barrier, or a combination thereof between the first coalesced layer and the second coalesced layer.

8. The method of claim 7, wherein the turbomachine component is a turbine nozzle, a turbine frame, a seal, a combustor liner, a combustor cap, a fuel nozzle, a compressor blade, a turbine blade, a compressor wheel, a turbine wheel, a shroud segment, a gas pre-mixer, a liquid fuel injector, a combustor-to-turbine transition piece, or any combination thereof.

9. The method of claim 7, wherein the first coalesced layer, the second coalesced layer, or a combination thereof comprises functionally graded materials.

10. The method of claim 7, wherein the first powder, the second powder, or a combination thereof comprises at least one of cobalt-chromium, stainless steel, titanium, a chromium-nickel based alloy, or a nickel based alloy.

11. The method of claim 7, wherein the first powder comprises a first material corresponding with the first coalesced layer and a second material corresponding with the second coalesced layer, wherein the second powder comprises a second material that is different than the first material.

12. The method of claim 7, wherein at least one of the first coalesced layer, the second coalesced layer, or the intermediate layer comprises a varying cross-sectional thickness throughout at least a portion of the layered structure.

13. The method of claim 7, comprising selectively heating the first coalesced layer such that at least a portion of the first coalesced layer is functionally graded.

14. The method of claim 7, wherein selectively heating the first powder to coalesce the first coalesced layer comprises melting the first powder.

15. The method of claim 7, comprising sealing the intermediate layer via at least the first coalesced layer and the second coalesced layer.

16. The method of claim 15, comprising sealing the intermediate layer via the first coalesced layer, the second coalesced layer, and at least one extension extending from the first coalesced layer to the second coalesced layer.

* * * * *